United States Patent [19]

Marquisee et al.

[11] 4,132,560

[45] Jan. 2, 1979

[54] PIGMENTED MICROPOROUS SILICA MICROSPHERES

[75] Inventors: Mark J. Marquisee; Lionel S. Sandell, both of Wilmington, Del.

[73] Assignee: E. I. Du Pont de Nemours and Company, Wilmington, Del.

[21] Appl. No.: 868,225

[22] Filed: Jan. 9, 1978

Related U.S. Application Data

[62] Division of Ser. No. 635,060, Nov. 25, 1975, Pat. No. 4,090,887.

[51] Int. Cl.² .............................................. C04B 31/00
[52] U.S. Cl. .................................. 106/288 B; 106/293; 106/296; 106/297; 106/300; 106/308 B
[58] Field of Search ................ 106/288 B, 308 B, 300, 106/297, 296, 293

[56] References Cited

U.S. PATENT DOCUMENTS

| | | | |
|---|---|---|---|
| 2,384,946 | 9/1945 | Marisic | 252/451 |
| 2,528,767 | 11/1950 | Marisic | 252/448 |
| 2,782,869 | 2/1957 | Gray | 423/338 |
| 3,301,635 | 1/1967 | Bergna et al. | 423/335 |
| 3,321,276 | 5/1967 | Burzynski et al. | 423/338 |
| 3,848,059 | 11/1974 | Ernita | 423/327 |
| 3,855,172 | 12/1974 | Iler et al. | 106/288 B |
| 4,011,096 | 3/1977 | Sandell | 106/288 B |

FOREIGN PATENT DOCUMENTS 2503332  8/1975  Fed. Rep. of Germany.

*Primary Examiner*—G. O. Peters
*Assistant Examiner*—Mark Bell

[57] ABSTRACT

Pigmented silica microsphere having an average diameter from 2 μm to 100 μm and consisting essentially of from 10% to 70% by weight of particulate pigment, dispersed throughout a microporous silica matrix and, optionally, containing a coating of dense amorphous silica. The microspheres are produced by acidifying a water-in-oil emulsion. The pigmented silica microspheres are particularly useful as opacifying agents for coating compositions and as fillers for paper.

6 Claims, 1 Drawing Figure

F I G. 1
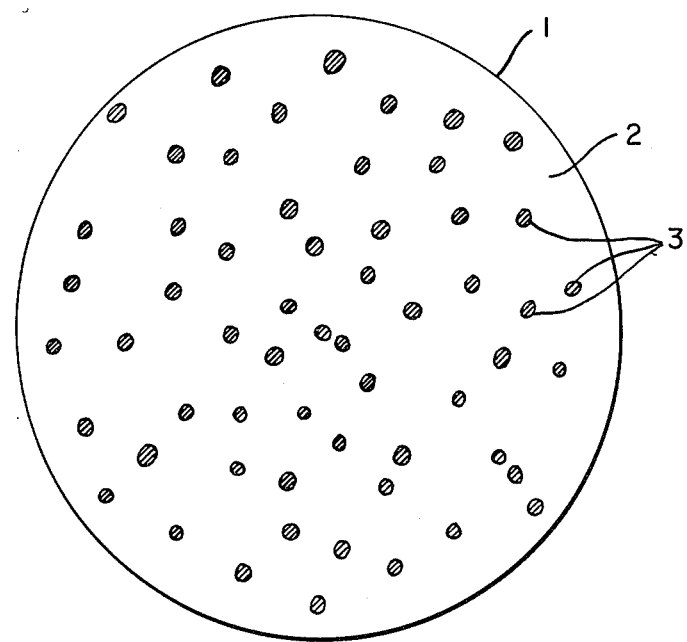

PIGMENTED MICROPOROUS SILICA MICROSPHERES

This is a division, of application Ser. No. 635,060, filed Nov. 25, 1975, now U.S. Pat. No. 4,090,887.

BACKGROUND OF THE INVENTION

This invention relates to pigmented silica microspheres which are useful as opacifying agents for coating compositions such as latex paints and as opacifiers and fillers for fibrous substrates such as paper.

A wide variety of porous silica particles are known in the art. The porous silica particles are commonly designed for use as catalysts or catalyst supports and less commonly for use as molding powders and insulating materials. Porous silica particles used as catalysts or catalyst supports are generally relatively large spherical particles, referred to as "beads," containing typical geltype pores having a maximum diameter of less than about $0.01\mu$. Porous silica particles of this type have been prepared by acidifying an aqueous solution of sodium silicate to form a silica gel, then agitating the gel in an oil at elevated temperatures to form silica "beads" or spherical silica particles, as described, for example, in U.S. Pat. Nos. 2,384,946 and 2,528,767. Molding powders composed of porous silica microspheres having a diameter in the range of $0.1\mu$ to $50\mu$ have been made by spray drying sols containing colloidal silica, as described in U.S. Pat. No. 3,301,635. The microspheres produced by this process are nonuniform aggregates of colloidal silica particles which, when compacted, have pores in the size ranges of $0.02\mu$ to $5\mu$. Although the porosity of the compacted silica particles provides some opacity, the opacity is insufficient for pigmentary applications.

Hollow silica spheres having an average diameter from $100\mu$ to $2500\mu$, useful as insulated materials, have been made by suspending particles of alkali metal silicate and a metal oxide with a compound which liberates a gas at elevated temperatures and heating the particles to $1000°-2500°$ F. $(540°-1371°$ C.). The hollow silica spheres produced by this process are generally clear and transparent, rather than opaque, because the large air cell within the hollow sphere is too large to scatter light effectively.

A method for producing reticulated inorganic microparticles useful as pigment is described in U.S. Pat. No. 3,848,059. This process comprises mixing two separate water-in-oil emulsions, each containing a separate inorganic salt to form spherical shaped microparticles of an insoluble salt having an average particle size which falls within the range of $0.1\mu$ to $5.0\mu$. The degree of porosity for these spherical microparticles is insufficient for use as highly effective opacifying agents.

Highly porous inorganic microparticles having an average pore diameter of $0.03\mu$ are described in U.S. Pat. No. 3,855,172. The inorganic microparticles are prepared by forming a sol of inorganic colloidal particles in a polar liquid, forming a homogeneous solution of the sol with a polymerizable organic material, and polymerizing the organic material. The organic material is burned off to form the porous microparticle. While the type of porosity which results renders these particles highly effective as catalyst supports, these particles are useless as opacifying agents.

Generally, the porous silica microparticles formed by the process of the prior art are either large porous or hollow microspheres or very dense microparticles which lack sufficient opacity for use in many applications.

This invention provides for a pigmented silica microsphere by a single emulsion technique which exhibits high opacity and combines ease of preparation with economy.

SUMMARY OF THE INVENTION

According to the invention there is provided a pigmented silica microsphere having a diameter from 2 $\mu$m to $100\mu$ and consisting essentially of from 10% to 70% by weight of particulate pigment, based on the total weight of the microsphere, dispersed throughout a microporous silica matrix, the silica matrix containing from 20% to 60% by volume of micropores, based on the total volume of the microsphere, the micropores having a median diameter of 0.004 $\mu$m to 0.05 $\mu$m. If desired for added strength, the pigmented silica microspheres can have a coating of dense amorphous silica in an amount from 2% to 40% by weight, based on the total weight of the coated pigmented silica microsphere. The pigmented silica microsphere, coated or uncoated, is substantially spheroidal and, preferably, has a substantially smooth, continuous surface. The average diameter of the microsphere is preferably from 2 $\mu$m to 50 $\mu$m when used as a paper filler and from 2 $\mu$m to 25 $\mu$m when used as an opacifying agent in paint.

The particulate pigment dispersed, preferably uniformly, throughout the microporous silica matrix should preferably have a particle size from 0.1 $\mu$m to 0.5 $\mu$m. A wide variety of organic and inorganic pigments may be dispersed throughout the microporous silica matrix. Among the organic pigments which may be employed are metal phthalocyanines, such as copper phthalocyanine, substituted and unsubstituted quinacridones, benzidine yellows, toluidine yellows, and azo pigments. Inorganic colored pigments such as lead chromate may also be useful. If desired, mixtures of organic and inorganic pigment may also be employed in the microspheres of the invention. The maximum advantages of the invention are realized if the pigment has a refractive index of at least 2. Since inorganic pigments commonly exhibit the desired high refractive index, they are preferred. Although white lead, zinc oxide, zinc sulphide, silicon carbide and various types of metal oxides and other inorganic materials can be used, titanium dioxide is preferred. Such inorganic pigments can be used alone or may be used in combination with organic pigments. The inorganic pigments, such as $TiO_2$, can be uncoated or contain conventional hydrous oxide coatings, such as silica, alumina, titania and the like.

The pigmented silica microspheres of the invention are prepared by the steps of (i) forming a water-in-oil emulsion by contacting a silaceous aqueous phase with an oil phase, said silaceous aqueous phase consisting of water, particulate pigment, and at least one silicon compound selected from the group consisting of colloidal silica and alkali metal silicate, said oil phase consisting of at least one water-immiscible hydrocarbon selected from the group consisting of liquid and low melting aliphatic, aromatic and chlorinated hydrocarbons, (ii) adding acid to the water-in-oil emulsion formed in Step (i), the acid being added in an amount from 0.5 to 2.0 times the amount of acid needed to react stoichiometrically with the total amount of base present in the silaceous aqueous phase of Step (i) to gel the silaceous aqueous phase and form a slurry of pigmented silica microspheres, and (iii) separating the pigmented silica microspheres from the slurry formed in Step (ii).

The pigmented silica microspheres can be separated from the slurry by conventional means such as centrifugation or filtration. To insure that the pigmented silica microspheres are freed from any residual oil which may remain on the surface of the microsphere, the separated microspheres of Step (iii) can be dispersed in an aqueous or alcoholic solution of a hydrophilic surfactant, separated from the solution of surfactant, and washed with water or alcohol. By dispersing the microspheres in an aqueous or alcoholic solution iof hydrophilic surfactant any residual oil on the surface of the microspheres is dispersed in the surfactant solution which is then separated from the microspheres by conventional techniques such as filtration. Washing the microspheres with water or alcohol insures the removal of any residual surfactant or salts formed during processing which may remain on the surface of the microspheres. If aggregates of microspheres, which may form during the preparative process, are observed during the washing process described above, it is preferable at some stage in the washing process to pass the microsphere slurry through a screen, e.g., 325 mesh (Standard U.S. Sieve), to remove the aggregates.

The pigmented silica microspheres can be dried or left as a wet cake prior to use without further processing. In applications requiring particularly high strength and low friability, it is preferred that the microspheres be coated with dense amorphous silica described, for example, in U.S. Pat. No. 2,731,326. Pigmented silica microspheres having a coating of dense amorphous silica are prepared by the additional steps of (iv) forming an aqueous slurry of pigmented silica microspheres, (v) adjusting the pH of the aqueous slurry of Step (iv) to from 8 to 11 at a temperature from 60° C. to 125° C., (vi) contacting the aqueous slurry of Step (v) with an aqueous solution of an alkali metal silicate in an amount sufficient to provide from 2% to 40% by weight of silica, calculated as $SiO_2$ and based on the total solids in the aqueous slurry of Step (v) and the aqueous solution, (vii) adjusting the pH of the slurry of Step (vi) to less than 8, preferably 7.5, to deposit a coating of dense amorphous silica on the pigmented silica microspheres. The coated microspheres can be separated from the aqueous slurry in the conventional manner without further treatment or can be subjected to curing by the additional step of (viii) maintaining the slurry of step (vii) at a temperature of at least 80° C. for at least 1 hour. The coating process is particularly useful for pigmented silica microspheres prepared using colloidal silica.

For applications requiring particularly high opacity, the opacifying power and porosity of the uncoated pigmented silica microspheres can be increased by the additional steps of (iva) forming an aqueous slurry of pigmented silica microspheres of Step (iii), and (va) heating the aqueous slurry of Step (iva) at a temperature from 80° C. to 300° C., temperatures above the boiling point of the aqueous slurry requiring pressure to prevent boiling, and at a pH from 5 to 10.7. This after-treatment is particularly useful for pigmented silica microspheres prepared using an alkali metal silicate.

DESCRIPTION OF THE DRAWING

FIG. 1 shows a schematic cross-sectional view of a typical single pigmented silica microsphere of the invention.

DETAILED DESCRIPTION OF THE INVENTION

Referring to FIG. 1, a typical pigmented silica microsphere, 1, is substantially spherical and has a diameter from 2 μm to 100 μm. The microsphere, 1, consists essentially of a silica gel or matrix, 2, which contains a plurality of micropores (not shown) having a median diameter from 0.004 μm to 0.05 μm. These micropores which are too small to effectively scatter light, are not to be confused with vesicles or voids commonly incorporated in materials to increase opacity. Unlike the micropores, vesicles or voids are at least 0.1 μm in diameter and therefore sufficiently large to effectively scatter light. Dispersed throughout the microporous silica matrix are a plurality of pigment particles, 3, having average particle sizes commonly from 0.1 μm to 0.5 μm. The particulate pigment can have a wide variety of shapes, e.g., from spherical anatase $TiO_2$ to acicular rutile $TiO_2$. Although the micropores are too small to effectively scatter light, the micropores enhance the light scattering power of high refractive index pigment, such as $TiO_2$, in the microsphere by lowering the average refractive index of the surrounding silica matrix to a value intermediate between that of nonporous silica and air. In this way the particulate pigment incorporated in the microporous silica matrix exhibits greater light scattering efficiency than the same pigment embedded in a nonporous composition of the same refractive index as nonporous silica.

The pigmented silica microspheres can be prepared by forming a water-in-oil emulsion by mixing a silaceous aqueous phase and an oil phase, after which the silica is gelled by contact with acid.

The silaceous aqueous phase preferably contains from 5% to 40% by weight of silica, calculated as $SiO_2$ and based on the total weight of the silaceous aqueous phase. The source of silica can be alkali metal silicates such as sodium silicate or colloidal silica. Of the alkali metal silicates, sodium silicates with a $SiO_2:Na_2O$ weight ratio from about 2:1 to 4:1 are preferred. For example, when utilizing a 38% by weight solution of sodium silicate having a 3.25:1 $SiO_2:Na_2O$ weight ratio, it is preferred that one volume of the 38% solution be diluted with one volume of water prior to use. Colloidal silica is preferably in the form of a colloidal silica sol containing from 10% to 40% by weight of silica having a particle diameter from 5 nm to 50 nm. In addition to the source of silica and particulate pigment, the silaceous aqueous phase may also contain from 0.1% to 5% by weight of an anionic or nonionic dispersant, based on the weight of the particulate pigment, to prevent possible aggregation of the particulate pigment which may occur during the acidification process which follows emulsification. Nonionic dispersants including water soluble polymeric dispersants, such as polyvinylpyrrolidone, hydroxyethyl cellulose, polyvinyl alcohol, and amine type dispersants, may be used. Amine type dispersants, such as 2-amino-2-methyl-1-propanol and 1,6-hexamethylenediamine, are preferred.

The oil phase should contain at least one water-immiscible hydrocarbon selected from liquid and low melting aliphatic, aromatic and chlorinated hydrocarbons, e.g., cyclohexane, hexane, heptane, naptha, mineral spirits, xylene, chloroform and carbon tetrachloride. To insure the formation of a stable water-in-oil emulsion and uniformly sized water-droplets, the oil phase should preferably contain from 0.5% to 15% by weight of a nonionic water-in-oil emulsifier, based on the total weight of the oil phase. Preferred water-in-oil emulsifiers include lyophilic fatty acid esters, ethoxylated alcohols and glycerides. In the silaceous aqueous phase, it is preferable to include from 0.1% to 5% by weight of a soluble aluminum compound, based on the weight of the total solids in the silaceous aqueous phase and oil phase, in the oil phase. It is believed that the aluminum compound adsorbs on the surface of the silicate microspheres and deactivates their surfaces, thus reducing any tendency to aggregate formation and adhesion to the blending equipment. The major criteria governing the selection of the aluminum compound are at least moderate solubility in organic media and inability to adversely affect the water-in-oil emulsion. Suitable soluble aluminum compounds include aluminum acetate and aluminum isopropoxide.

In forming the water-in-oil emulsion, the ratio of the total volume of the silaceous aqueous phase to the total volume of the oil phase is preferably from 1:6 to 1:1.

To gel the silica in the silaceous aqueous phase of the water-in-oil emulsion, acid is added to the emulsion in an amount from 0.5 to 2.0 times the amount needed to react stoichiometrically with the total amount of base present in the silaceous aqueous phase. A large excess of acid is not recommended, since the presence of excess acid tends to break the water-in-oil emulsion. The acid is preferably oil- and water-miscible, such as glacial acetic acid, trichloroacetic acid, chloroacetic acid, and formic acid. In practice, the acid can be added alone or diluted with, for example, additional oil phase.

The pigmented silica microspheres can be separated from the emulsion slurry by conventional methods such as filtration, decantation, or centrifugation. To insure that the microspheres are free of any residual oil phase which may adhere to their surface, the microspheres can be slurried in an aqueous or alcoholic solution of a surfactant, such as a highly hydrophilic fatty acid ester or ethoxylated alcohol. The resulting slurry can then be redispersed in water or alcohol and, if desired, filtered through a screen, e.g., 325 mesh (Standard U.S. Sieve), to remove any aggregates which may be present. The pH of the filtered slurry is preferably adjusted to from 6 to 8.5 prior to removal of the microspheres therefrom by filtration and washing. The filtered microspheres can be dried or concentrated to a wetcake.

As described above, the resulting pigmented silica microspheres can be after-treated to increase opacity by heating at elevated temperatures, i.e., 80° C. to 300° C., and preferably from 150° C. to 200° C., and at a pH from 5 to 10.7, preferably from 7 to 10.7. The period of time which the microspheres are subjected to these conditions can range from a few minutes to several days, depending upon the temperature employed. For example, at 200° C. to 300° C. additional porosity is developed in a few minutes, whereas at 80° C. to 100° C. several days are usually required. It is preferred that the microspheres by separated from the emulsion slurry in which they were prepared but not washed free of salts prior to forming the aqueous slurry which will be heated in accordance with the above-described procedure, because the presence of soluble salts which form upon acidification of the emulsion slurry tends to accelerate the development of additional porosity.

A coating of dense amorphous silica can be applied to the pigmented silica microspheres to increase strength and lower friability of the microspheres. The dense amorphous form of silica is well-known in the art and differs from the microporous silica matrix in that the dense amorphous form exhibits substantially no porosity and no definitive structure. The nature of dense amorphous silica and a variety of methods for its preparation are described, for example, in U.S. Pat. No. 2,731,326.

The pigmented silica microspheres of the invention are highly useful as opacifying agents for a variety of coating compositions made with a solution vehicle. The microspheres perform most effectively when the nonvolatile components of the vehicle do not penetrate the microporous structure, as in the case of latex paints the micropores are too small to be penetrated by the latex particles. The microspheres may be added dry, or preferably as an aqueous wetcake to a preformulated aqueous latex emulsion. In a conventional latex paint the pigment volume concentration (PVC) is high enough to cause severe crowding of the pigment particles in the dry film, resulting in a significant loss in pigment scattering efficiency. Such crowding effects are reduced when pigmented silica microspheres are used to opacify latex paints. The pigment being uniformly distributed and fixed inside the silica matrix loses no scattering efficiency due to crowding at high microsphere loadings in the paint. For example, from 20% to 70% by volume of microspheres, based on the total volume of solids in the paint composition, may be mixed with a typical starting paint or masterbatch emulsion formulated at about 34 PVC (pigment volume concentration) and containing about 3 lb./gal. (0.36 kilogram/liter) of $TiO_2$ with little or no extender. The microspheres are also useful as flatting agents for paints, particularly in the size range above $5\mu$.

The microspheres of the invention are also useful as an opacifying agent and filler for fibrous substrates such as paper. In the paper industry, fillers such as $TiO_2$, clay or calcium carbonate are added to the paper furnish prior to formation of the fibrous web on the paper-making machine. Since these fillers generally contain particles of less than 1 $\mu$m in diameter, a substantial portion of the filler passes through the fibrous web and remains in the whitewater. The microspheres of the invention should have higher retention than the common fillers because of their larger particle size and at the same time provide high opacity.

A further advantage of the microspheres is their light weight. The density of the microspheres is substantially lower than conventional filler pigments, and consequently the microspheres are particularly useful for producing light weight paper with high opacity.

DESCRIPTION OF THE TESTS

In the experimental examples which follow paint compositions containing the pigmented silica microspheres of the invention were tested for opacity (as measured by the scattering coefficient), scrub resistance and stain resistance in accordance with the following procedures.

Scattering Coefficient

The scattering coefficient for a paint composition is a common measure of the opacity or hiding power of the paint per mil (0.0254 millimeter) of wet paint film thickness. To determine the scattering coefficient for each paint tested, the paint is drawn on a Morest Chart Form 09, a glossy paper chart having black and white areas, using a draw-down blade with a 0.002 inch (0.005 cm.) clearance, at 50% R. H. and 72° F. (22° C.). The film is allowed to dry overnight and reflectances over the white and black backgrounds are measured using a Gardner Automatic Multi-purpose Reflectometer using a green filter. One reading is taken on each of two "white" and "black" sections of each of four charts. The scattering coefficient is determined, using the above-measured reflectances, from the appropriate Kubelka-Munk Chart (D. B. Judd, "Optical Specification of Light Scattering Materials," *Journal of Research of the National Bureau of Standards*, Vol. 19, 1937, p. 287).

Scrub Resistance

The scrub resistance of each test paint is determined in accordance with the procedure of ASTM method D 2486-69 T.

Test paint is applied to a black mylar panel with a 0.006 inch (0.015 cm.) clearance blade. After aging one week, the coated panel is placed over a ½ inch (1.27 cm.) by 10 mil (0.025 cm.) shim and held in place on a glass plate in a Gardner washability machine by means of a gasketed frame. It is then scrubbed with a hogshair bristle brush and an abrasive scrub medium until failure occurs over the shim. the number of scrub cycles to failure is noted.

Stain Resistance

To determine the stain resistance of the test paints, side-by-side draw-downs of a control paint and a test paint are made on white Morest charts using a draw-down blade having a 0.006 inch (0.015 cm.) clearance. After allowing the draw-downs to dry four days, equal areas of the side-by-side films are covered with an excess of a heavy, oil-based ink. After 90 seconds, the ink is wiped off as completely as possible with paper towels. The degree of staining (darkening of the film) is visually determined and the test paint is rated better or worse than the control. A "plus" designation indicates better stain resistance and a "minus" designation indicates worse stain resistance than the control. The degree of contrast relative to the control is ranked as one of the following: "equal, very slight, slight, considerable and definite."

The following examples illustrate the invention.

EXAMPLE 1

A silaceous aqueous phase is prepared by mixing 100 ml. of a commercially available colloidal silica sol containing 30% by weight of colloidal silica, sold by Du Pont under the name Ludox SM, 3.3 ml. of 70% by weight 1,6-hexamethylenediamine, and 30 g. of a commercially available $TiO_2$ pigment, sold by Du Pont under the name Ti-Pure R-900, in a laboratory mixer for five minutes.

A water-in-oil emulsion is prepared by agitating the above-prepared aqueous phase in 400 ml. of an oil phase containing one volume of cyclohexane, one volume of chloroform, and 0.2 volume of sorbitan monooleate (a nonionic water-in-oil emulsifying agent sold by ICI America under the name Span 80). Agitation is continued for three minutes using a blender fitted with a one quart (0.946 liter) blender jar and speed control to effect emulsification. While continuing the agitation, 200 ml. of the oil phase described above containing 1.5 ml. of glacial acetic acid is added and agitation is continued for three more minutes.

The resulting pigmented silica microspheres are then centrifuged to separate them from the oil phase. To insure the removal of any residual oil phase, the microspheres are dispersed in an excess of a 50% by volume aqueous solution of a hydrophilic fatty acid ester (a nonionic oil-in-water emulsifying agent sold by ICI Inc. under the name Tween 20), centrifuged and redispersed in water.

The above procedure is repeated several times to accumulate a sufficient quantity of microspheres for testing in paint compositions. The accumulated microsphere slurries are filtered through a 325 mesh (Standard U.S. Sieve) screen, then neutralized to pH 7 with glacial acetic acid. The resulting slurry is filtered and washed with water to a specific resistance of 60,000 Ω-cm. The solids content of the wet filtercake (wetcake) is 43.5%. A sample of the wetcake is dried at 110° C. and found to contain 94.25% by weight of ash of which 40.7% by weight is $TiO_2$ and 44.9% by weight is $SiO_2$. The dried microspheres exhibit a surface area of 116 m.$^2$/g. as measured by nitrogen adsorpsion and a solids density of 2.5 g./cc. as measured by liquid pycnometry. Examination of the dried microspheres under a light microscope reveals opaque spheres having diameters from 2 μm to 20 μm. From nitrogen adsorption analysis, the porosity of the microspheres is found to be approximately 45% by volume.

The pigmentary properties of the microspheres are evaluated by adding the wetcake to a preformulated latex paint masterbatch 100 gallons (45.35 l.) of which contains 310.6 lb. (139.8 kg.) of a commercially available $TiO_2$ pigment, sold by Du Pont under the name Ti-Pure R-931, and 334.1 lb. (150.3 kg.) of a conventional emulsion paint vehicle consisting of a 55% by weight solids polyvinyl acetate copolymer emulsion. Therefore, the masterbatch contains 3.1 lb. of $TiO_2$/gal. (0.27 kg./liter) and has a pigment volume concentration (PVC) of 34%, which is below the critical PVC.

The test paints are prepared by adjusting the pH of the masterbatch to 8.5 with ammonia then adding an amount of the microsphere wetcake to give the microsphere volume concentrations or "bead" volume concentrations (BVC) shown in Table I, paints T1-1 through T1-7. The BVC is determined from the following relationship:

$$BVC = \frac{\text{total volume of microspheres in dry paint film} \times 100}{\text{total volume of dry paint film}}.$$

As a control, a conventional emulsion paint is prepared using the same ingredients as in the masterbatch but with extenders to raise the PVC above critical. One hundred gallons (45.35 liters) of the control paint contains the same amount of $TiO_2$ as the masterbatch, 57.4 lb. (25.8 kg.) of silica extenders, 62.1 lb. (27.9 kg.) of calcium carbonate extender, and 281.6 lb. (127.7 kg.) of the masterbatch emulsion vehicle. Therefore, the control paint contains 3.1 lb. of $TiO_2$/gal. (0.27 kg./liter) and has a PVC of 50%. The properties of the control, referred to as C-1 are shown in Table I.

In addition to showing the high opacity of the paint compositions containing the pigmented silica microspheres of the invention, the data in Table I shows an additional feature of the invention, that is, the high bulking of the microspheres. In other words, the addition of the microspheres to the masterbatch substantially increases the final volume of the paint. Conventional opacifying pigments, such as $TiO_2$, are relatively dense (low bulking) and contribute little to the paint volume. Table I shows that the hiding power and the film properties of the test paints, T1-1 through T1-7, match the Control, C-1, at about a BVC of 40%. The stain resistance in all cases is at least as good as the Control, C-1.

tially similar appearance to the microspheres of Example 1.

To test the pigmentary properties of the dense amorphous silica coated microspheres, masterbatch, control, and test paint compositions are prepared in accordance with the procedure described in Example 1. The properties of the test paints are shown in Table II, wherein C-2 designates the Control and T2-1 through T2-7 designate the test paints. The data in Table II shows that the dense amorphous silica coating improves scrub resistance, i.e., lowers friability, with substantially no sacrifice in opacity. Thus a microsphere paint formulated at a BVC of 40% (T2-3) matched the Control C-2 in opacity but exceeded it in film properties.

TABLE I

| Example 1 Test Paint | BVC, % | Scattering Coefficient | Scrub Resistance | Stain Resistance | Relative Volume of Paint |
|---|---|---|---|---|---|
| Masterbatch | 0 | 2.13 | 620 | Definite + | 100 |
| T1-1 | 20 | 3.09 | 440 | Considerable + | 117 |
| T1-2 | 30 | 3.60 | 320 | Slight + | 129 |
| T1-3 | 40 | 3.88 | 240 | Very Slight + | 145 |
| T1-4 | 50 | 4.29 | 160 | Equal | 167 |
| T1-5 | 60 | 4.96 | 140 | Equal | 200 |
| T1-6 | 65 | 4.62 | 120 | Equal | 224 |
| T1-7 | 70 | 4.52 | 100 | Equal | 256 |
| C-1 | 0 | 3.87 | 260 | Control | 100 |

EXAMPLE 2

The procedure of Example 1 is followed except that the oil phase contains two volumes of carbon tetrachloride, three volumes of cyclohexane, and 0.5 volume of the sorbitan monooleate described in Example 1.

TABLE II

| Example 2 Test Paint | BVC, % | Scattering Coefficient | Scrub Resistance | Stain Resistance | Relative Volume of Paint |
|---|---|---|---|---|---|
| Masterbatch | 0 | 2.31 | 630 | Definite + | 100 |
| T2-1 | 20 | 3.19 | 520 | Considerable + | 114 |
| T2-2 | 30 | 3.79 | 430 | Slight + | 123 |
| T2-3 | 40 | 4.03 | 360 | Very Slight + | 136 |
| T2-4 | 50 | 5.03 | 260 | Equal | 154 |
| T2-5 | 60 | 5.89 | 260 | Equal | 181 |
| T2-6 | 65 | 5.77 | 210 | Equal | 201 |
| T2-7 | 70 | 5.77 | 200 | Equal | 227 |
| C-2 | 0 | 3.98 | 340 | Control | 100 |

The resulting microspheres exhibit substantially the same appearance as the microspheres of Example 1 when viewed under a light microscope.

EXAMPLE 3

Pigmented silica microspheres are prepared and isolated following the procedure of Example 1. A filtered and washed wetcake containing about 400 g. of the microspheres is slurried in two liters of water. The slurry is heated to 90° C. and held at that temperature while stirring slowly with a paddle blade mixer. The pH of the slurry is adjusted to 9.5 with 50% by weight aqueous solution of sodium hydroxide. Then 300 ml. of an aqueous solution containing one volume of 29% by weight solution of sodium silicate ($SiO_2/Na_2O$ = 3.25, Du Pont Technical Grade No. 9) and one volume of water is rapidly added to the slurry from a 500 ml. dropping funnel. The pH of the slurry after the sodium silicate addition is 10.1. To deposit a dense amorphous silica coating on the microspheres, about 310 ml. of a one molar aqueous solution of sulfuric acid is added to the slurry at a rate of about 9 ml./min. over a period of 34 minutes. The pH of the resulting slurry is 7.5. The slurry is then heated to 90° C. and held at that temperature for one hour. The dense amorphous silica coated microspheres are recovered by filtration and washed to a specific resistance of 22,000 Ω-cm. The wetcake solids content is 49.5%. Analysis of the dried sample, as described in Example 1, shows 94.6% of ash, of which 62.3% by weight is $SiO_2$ and 34.9% by weight is $TiO_2$. The dried product has a surface area of 106 m.$^2$/g. and when viewed under a light microscope shows a substan-

EXAMPLE 4

To a one quart (0.946 liter) blender jar are added 500 ml. of an aqueous solution containing one volume of water and one volume of a 29% by weight solution of sodium silicate ($SiO_2/Na_2O$ = 3.25, Du Pont Technical Grade No. 9) and 3.0 g. of 2-amino-2-methyl-1-propanol. While mixing the solution, 100 g. of a commercially available $TiO_2$ pigment sold by Du Pont under the name Ti-Pure R-100 is added to the solution. Mixing is continued for five minutes. Then 250 ml. of the resulting slurry is transferred to a 2000 ml. plastic beaker.

To form a water-in-oil emulsion 1000 ml. of an oil phase consisting of one volume of chloroform, one volume of cyclohexane, 0.2 volume of the sorbitan monooleate described in Example 1, and 2.5 g. of aluminum acetate (basic) is added to the beaker containing the silaceous aqueous phase prepared above. The emulsification is effected by mixing for 3 minutes with a Gifford-Wood homogenizer-mixer. While continuing the mixing 200 ml. of the oil phase (with the aluminum acetate) containing 27.0 ml. of glacial acetic acid is poured into the emulsion and mixing is continued for three more minutes.

The resulting microspheres are isolated as described in Example 1 and washed to a specific resistance of 20,000 Ω-cm. A wetcake of 56.0% by weight of solids is obtained. Analysis of a dried sample shows 75.5% of ash of which 48.6% is $TiO_2$ and 50.0% is $SiO_2$. The surface area of the dried microspheres is 83 m.$^2$/g. and the solids density is 2.05 g./cc. From nitrogen adsorption analysis the porosity is found to be about 35% by volume. Upon examination under a light microscope, the microspheres exhibit diameters from 5 μm to 10 μm.

To determine the pigmentary properties of the pigmented silica microspheres, masterbatch, test samples, and a control are prepared as described in Example 1. The data, shown in Table III, illustrates that the opacifying power of these microspheres is not as great as those prepared using colloidal silica as described in Example 1, due to lower porosity. However, the film properties are good, matching the control C-4 at a BVC of 50% and acceptable as high as a BVC of 65%.

TABLE III

| Example 4 Test Paint | BVC, % | Scattering Coefficient | Scrub Resistance | Stain Resistance | Relative Volume of Paint |
|---|---|---|---|---|---|
| Masterbatch | 0 | 2.16 | 610 | Definite + | 100 |
| T4-1 | 20 | 2.60 | 590 | Considerable + | 112 |
| T4-2 | 30 | 2.90 | 530 | Considerable + | 121 |
| T4-3 | 40 | 3.12 | 450 | Slight + | 132 |
| T4-4 | 50 | 3.30 | 340 | Very slight + | 148 |
| T4-5 | 60 | 3.48 | 250 | Very Slight + | 172 |
| T4-6 | 65 | 3.42 | 200 | Equal | 189 |
| C-4 | 0 | 4.21 | 340 | Control | 100 |

EXAMPLE 5

Four hundred grams of pigmented silica microspheres prepared as described in Example 4 are washed once (specific resistance 130 Ω-cm.) and filtered through a screen as described in Example 1. The resulting microsphere slurry is diluted to a volume of three liters with water and added to a five-liter, four-neck, round-bottom flask fitted with a stirrer, thermometer, reflux condenser, and heating mantle. The slurry is heated to 100° C. while slowly stirring and allowed to reflux for one day at pH 7.2. The pH is then raised to 9 with an aqueous solution of 50% by weight of sodium hydroxide. After refluxing for two more days, the slurry is cooled and the pH adjusted to 7 with glacial acetic acid. The slurry is filtered and washed to a specific resistance of 30,000 Ω-cm. The wetcake solids content is 53.6% by weight. Analysis of a dried sample shows 95.8% by weight of ash, of which 48.0% by weight is TiO$_2$ and 51.1% by weight is SiO$_2$. The surface area of the dried microspheres is 62 m.$^2$/g. and solids density is 2.51 g./cc. The porosity via nitrogen adsorption is 48% by volume.

To determine the pigmentary properties of the pigmented silica microspheres, masterbatch, test samples and a control are prepared as described in Example 1. The data, shown in Table IV, illustrates that the higher internal porosity of these after-treated microspheres results in greater hiding power than the microspheres of Example 4.

TABLE IV

| Example 5 Test Paint | BVC, % | Scattering Coefficient | Scrub Resistance | Stain Resistance | Relative Volume of Paint |
|---|---|---|---|---|---|
| Masterbatch | 0 | 2.16 | 600 | — | 100 |
| T5-1 | 24 | 2.94 | 580 | Slight + | 115 |
| T5-2 | 35 | 3.35 | 450 | Very Slight + | 125 |
| T5-3 | 45 | 3.70 | 320 | Equal | 139 |
| T5-4 | 56 | 4.06 | 250 | Very Slight − | 159 |
| T5-5 | 65 | 4.11 | 190 | Slight − | 188 |
| T5-6 | 70 | 4.37 | 170 | Slight − | 209 |
| T5-7 | 0 | 4.21 | 340 | Control | 100 |

EXAMPLE 6

The procedure of Example 5 is followed except that after the first wash and filtration the microsphere slurry is diluted to two liters with water, the pH is adjusted to 9, and the slurry is heated to 150° C. for three hours in an autoclave. The slurry is then cooled, the pH adjusted to 7, and washed to a specific resistance of 20,000 Ω-cm. The wetcake solids content is 43.0% by weight and the dried microspheres contain 94.3% by weight of ash, of which 50.1% by weight is TiO$_2$, and 50.6% by weight is SiO$_2$. The surface area is 46 m.$^2$/g.; solids density, 256 g./cc.; and porosity, 41% by volume.

The pigmentary properties for the microspheres in test paints versus the masterbatch and control, prepared as described in Example 1, are shown in Table V.

TABLE V

| Example 6 Test Paint | BVC, % | Scattering Coefficient | Scrub Resistance | Stain Resistance | Relative Volume of Paint |
|---|---|---|---|---|---|
| Masterbatch | 0 | 2.41 | 990 | Definite + | 100 |
| T6-1 | 21 | 2.80 | 530 | Slight + | 120 |
| T6-2 | 32 | 3.36 | 510 | Very Slight + | 134 |
| T6-3 | 42 | 3.74 | 360 | Very Slight − | 153 |
| T6-4 | 52 | 4.28 | 260 | Slight − | 179 |
| T6-5 | 62 | 4.17 | 140 | Considerable − | 219 |
| C-6 | 0 | 3.68 | 500 | Control | 100 |

EXAMPLE 7

The procedure of Example 6 is followed except that the microsphere slurry is at pH 7 and is heated to 150° C. for 15 minutes. The resulting wetcake contains 40.5% by weight of solids. The dried microspheres contain 88.3% by weight of ash, of which 49.6% by weight is TiO$_2$, and 51.3% by weight is SiO$_2$. The surface area of the microspheres is 79 m.$^2$/g.; solids density, 2.45 g./cc.; and porosity, 48% by volume.

The pigmentary properties of the microspheres, shown in Table VI, are determined from masterbatch, test paints, and a control prepared as described in Example 1.

TABLE VI

| Example 7 Test Paint | BVC, % | Scattering Coefficient | Relative Volume of Paint |
|---|---|---|---|
| Masterbatch | 0 | 2.29 | 100 |
| T7-1 | 23 | 2.48 | 120 |
| T7-2 | 34 | 2.90 | 134 |
| T7-3 | 44 | 3.48 | 153 |
| T7-4 | 54 | 3.83 | 180 |
| T7-5 | 64 | 4.05 | 221 |
| T7-6 | 69 | 3.89 | 249 |
| C-7 | 0 | 3.55 | 100 |

What is claimed is:

1. Pigmented silica microsphere having a diameter from 2μ to 100μ and consisting essentially of from 10% to 70% by weight of particulate pigment, based on the total weight of the microsphere, dispersed throughout a microporous silica matrix, the silica matrix containing from 20% to 60% by volume of micropores, based on the total volume of the microsphere, the micropores having a median diameter from 0.004 μm to 0.05 μm.

2. Pigmented silica microsphere according to claim 1 having a coating of dense amorphous silica in an amount from 2% to 40% by weight, based on the total weight of the coated microsphere.

3. Pigmented silica microsphere according to claim 1 having an average diameter from 2 μm to 50 μm.

4. Pigmented silica microsphere according to claim 1 having an average diameter from 2 μm to 25 μm.

5. Pigmented silica microsphere according to claim 1 wherein the particulate pigment is an inorganic pigment having a refractive index of at least 2.

6. Pigmented silica microsphere according to claim 5 wherein the inorganic pigment has a particle size from 0.1 μm to 0.5 μm.

* * * * *